(12) United States Patent
Schmeller et al.

(10) Patent No.: US 8,044,649 B2
(45) Date of Patent: Oct. 25, 2011

(54) DUAL MODE REGULATION LOOP FOR SWITCH MODE POWER CONVERTER

(75) Inventors: Hans Schmeller, Forstern (DE); Christophe Vaucourt, Munich (FR)

(73) Assignee: Texas Instruments Deutschland GmbH, Freising (DE)

( * ) Notice: Subject to any disclaimer, the term of this patent is extended or adjusted under 35 U.S.C. 154(b) by 882 days.

(21) Appl. No.: 12/056,046

(22) Filed: Mar. 26, 2008

(65) Prior Publication Data

US 2008/0238387 A1    Oct. 2, 2008

(30) Foreign Application Priority Data

Mar. 26, 2007  (DE) .................. 10 2007 014 399

(51) Int. Cl.
*G05F 1/575* (2006.01)

(52) U.S. Cl. ...................................... 323/285; 323/222

(58) Field of Classification Search .................. 323/222, 323/285, 282, 280–281; 363/41; 700/75
See application file for complete search history.

(56) References Cited

U.S. PATENT DOCUMENTS

| | | | | |
|---|---|---|---|---|
| 5,479,090 A * | 12/1995 | Schultz | ..................... | 323/284 |
| 6,184,660 B1 * | 2/2001 | Hatular | ..................... | 320/141 |
| 6,456,051 B2 | 9/2002 | Darzy | | |
| 6,456,511 B1 * | 9/2002 | Wong | ..................... | 363/21.13 |
| 6,630,817 B1 * | 10/2003 | Kison et al. | ................. | 323/274 |
| 7,106,037 B2 | 9/2006 | Ohtake et al. | | |
| 7,365,718 B2 * | 4/2008 | Tsuchida et al. | ............. | 345/82 |
| 7,515,444 B2 * | 4/2009 | Chen | ............. | 363/97 |

FOREIGN PATENT DOCUMENTS

EP          0752748          1/1997

* cited by examiner

*Primary Examiner* — Harry Behm
(74) *Attorney, Agent, or Firm* — William B. Kempler; Wade J. Brady, III; Frederick J. Telecky

(57) ABSTRACT

The invention relates to a DC-DC converter, which includes a power stage driven by a pulse width modulator, a first error amplifier with a first input coupled to a first reference voltage source and a second input coupled to a current sink through which a current is fed from an output of the power stage to receive a first feedback voltage (FB1), a second error amplifier with a first input coupled to a second reference voltage source and a second input coupled to the output of the power stage to receive a second reference voltage (FB2), and switching means (SW1) for connecting a control input of the pulse width modulator with the output of the first error amplifier in a current regulation mode and with the output of the second error amplifier in a voltage regulation control mode.

1 Claim, 5 Drawing Sheets

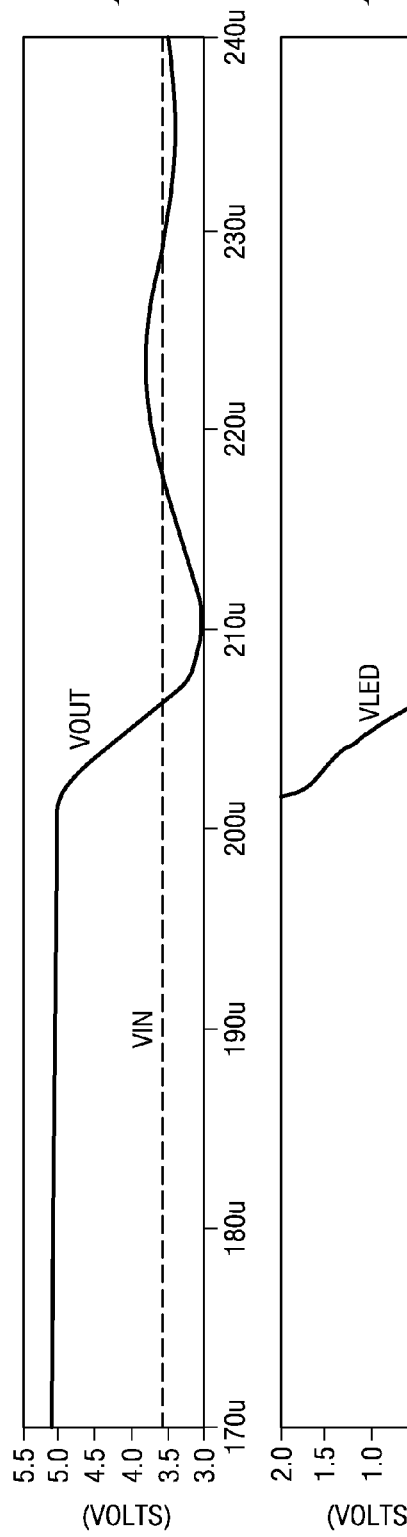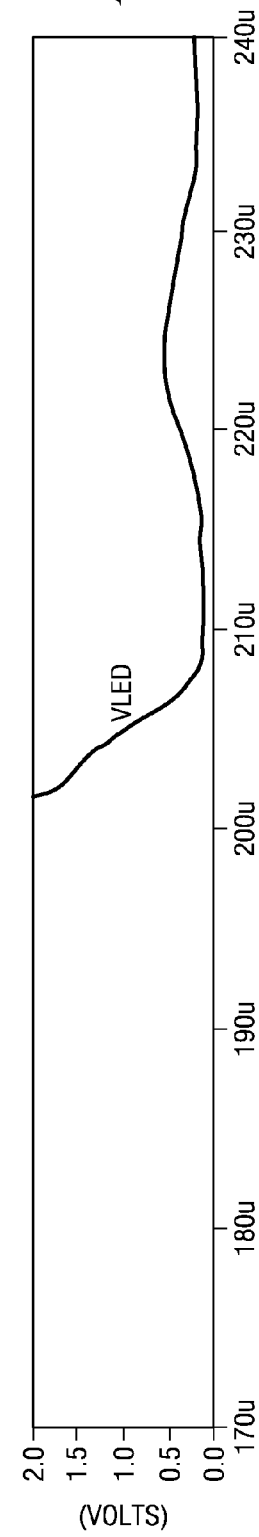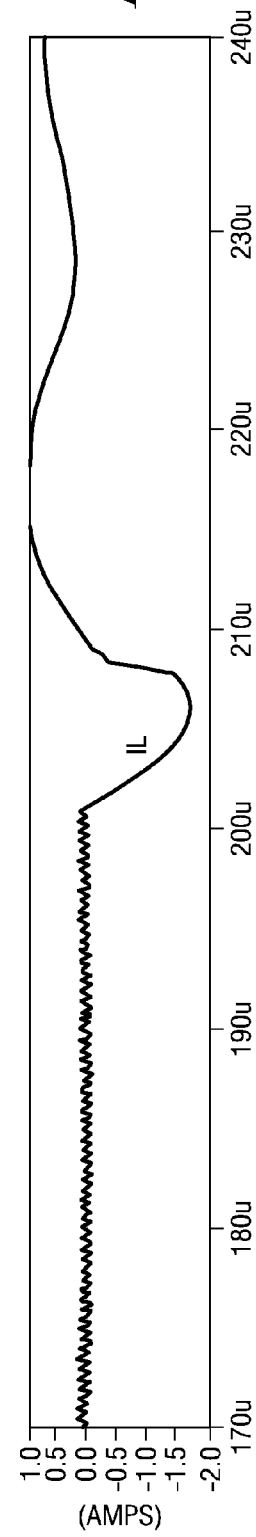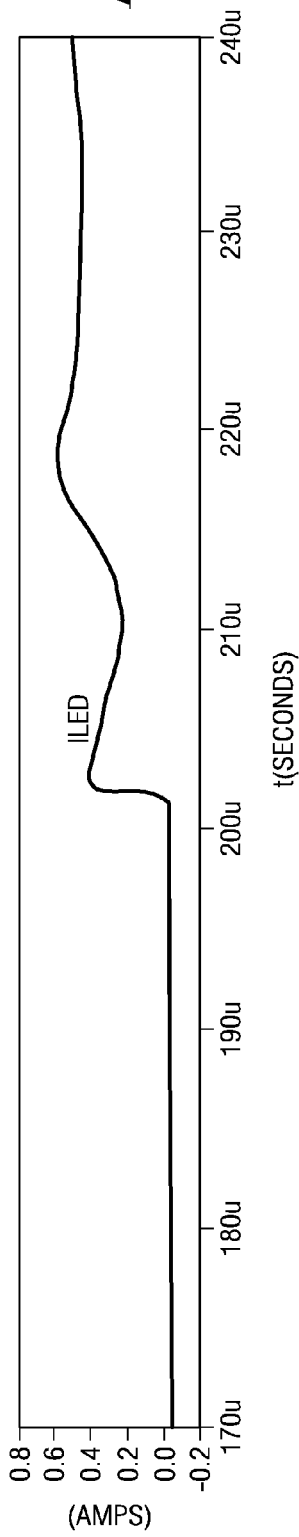

DUAL MODE REGULATION LOOP FOR SWITCH MODE POWER CONVERTER

This application claims priority from German Patent Application No. 10 2007 014 399.2, filed Mar. 26, 2007, the entirety of which is hereby incorporated herein by reference.

FIELD OF THE INVENTION

The invention relates generally to a DC-DC converter; and, more specifically, to a DC-DC converter with a power stage driven by a pulse width modulator.

BACKGROUND

DC-DC converters are used for a broad variety of applications and devices, in particular battery driven hand-held and portable applications. Some devices require several different voltages or currents for different parts and functions of the device. One example for such device is a cell phone with an integrated camera module, where a constant voltage may be required for the regular cell phone functions and a high current for the flash light of the camera. A conventional approach provides an individual DC-DC converter stage with individual regulation loops for each function. However, this approach is expensive, power consuming and bulky.

SUMMARY

It is an object of the invention to provide a DC-DC converter that is suitable for multiple different applications and yet is smaller in size and less complex than prior art solutions.

Accordingly, a DC-DC converter with a power stage driven by a pulse width modulator is provided. In a described embodiment, the converter includes a first error amplifier, a second error amplifier, and switching circuitry for connecting a control input of the pulse width modulator to an output of the first error amplifier in a current regulation mode and to an output of the second error amplifier in a voltage regulation control mode. The first error amplifier has a first input coupled to a first reference voltage source and a second input coupled to receive a first feedback voltage from a current sink through which a current is fed from an output of the power stage. The second error amplifier has a first input coupled to a second reference voltage source and a second input coupled to receive a second reference voltage through connection to the output of the power stage. The switching circuitry enables the DC-DC converter to support at least two different regulation mechanisms. Either one of the regulation mechanisms can be implemented by an individual regulation loop (feedback loop) coupled to an individual error amplifier. A control input of the pulse width modulator is switched between the outputs of the error amplifiers, thereby switching the DC-DC converter from one regulation mode (e.g. for regulating the output voltage to a constant level) to another regulation mode (e.g. for providing a constant output current).

When using one DC-DC converter for two different applications with two different magnitudes (i.e. output voltages or currents), however, the switching may cause strong loop responses which could lead to undesired and unstable output signals for the DC-DC converter. Therefore, the DC-DC converter may also be advantageously provided with a reference voltage controller for dynamically varying the voltage value of the second reference voltage source in order to reduce transients when switching between the voltage and current regulation modes. In one implementation, the reference voltage controller is adapted to vary the value of the second reference voltage source from a predetermined reference voltage value towards the first reference voltage after a transition from the voltage regulation mode to the current regulation mode, and to supply a first comparison result to the input of the pulse width modulator by a first switch only when the second reference voltage is substantially equal to the first reference voltage. The reference voltage controlling circuit is further adapted to keep the second reference voltage close to the second feedback voltage during the current regulation mode. The reference voltage controller is adapted to change the second reference voltage back to the predetermined reference voltage value only after connecting the output of the second error amplifier to the control input of the pulse width modulator by the first switch in response to a transition from the current regulation mode to the voltage regulation mode. Accordingly, the invention provides a way to avoid destabilization of the DC-DC converter due to transients produced by switching between different regulation modes.

The DC-DC converter according to described implementations is suitable to change quickly and smoothly from the current regulation mode to the voltage regulation mode, and vice versa. If the DC-DC converter regulates the output voltage in the voltage regulation mode, and the DC-DC converter is switched from the voltage regulation mode to the current regulation mode, the second reference voltage is smoothly changed to approach the first reference voltage before the first switch connects the output of the first error amplifier to the pulse width modulator. By smoothly adjusting the second reference voltage, the output voltage at the output node of the DC-DC converter is also smoothly adapted and the first feedback voltage approaches the first reference voltage. The first and the second reference voltages are at a substantially equal voltage level, if the control input of the pulse width modulator is switched from the output of the second error amplifier to the first error amplifier. Accordingly, oscillations of the voltages and currents due to an abrupt change of the input of the first regulation loop (i.e. feedback loop) are minimized and the DC-DC converter settles quickly in the current regulation mode. During the current control mode, the second reference voltage is held at a voltage level which is basically equal to the voltage level occurring at the second feedback path in the current control mode. Accordingly, the two input signals of the second error amplifier are equal. If the DC-DC converter is switched back to the voltage regulation mode, no transient will occur in the second regulation loop (or feedback loop). Finally, in order to produce the correct output voltage at the output node of the DC-DC converter, the second reference voltage is smoothly returned to an initial and predetermined value, which is set so as to generate a specific output voltage.

BRIEF DESCRIPTION OF THE DRAWINGS

Further aspects of the invention will be evident from the following description of example embodiments with reference to the accompanying drawings, wherein:

FIGS. 2A-2D show waveforms of voltages and currents of a DC-DC converter without transient reduction;

FIGS. 5A-5D show waveforms of voltages and currents of a DC-DC converter with a circuit according to the embodiment of FIG. 3 switched from current regulation mode to voltage regulation mode.

DETAILED DESCRIPTION OF EXAMPLE EMBODIMENTS

Figure 1:
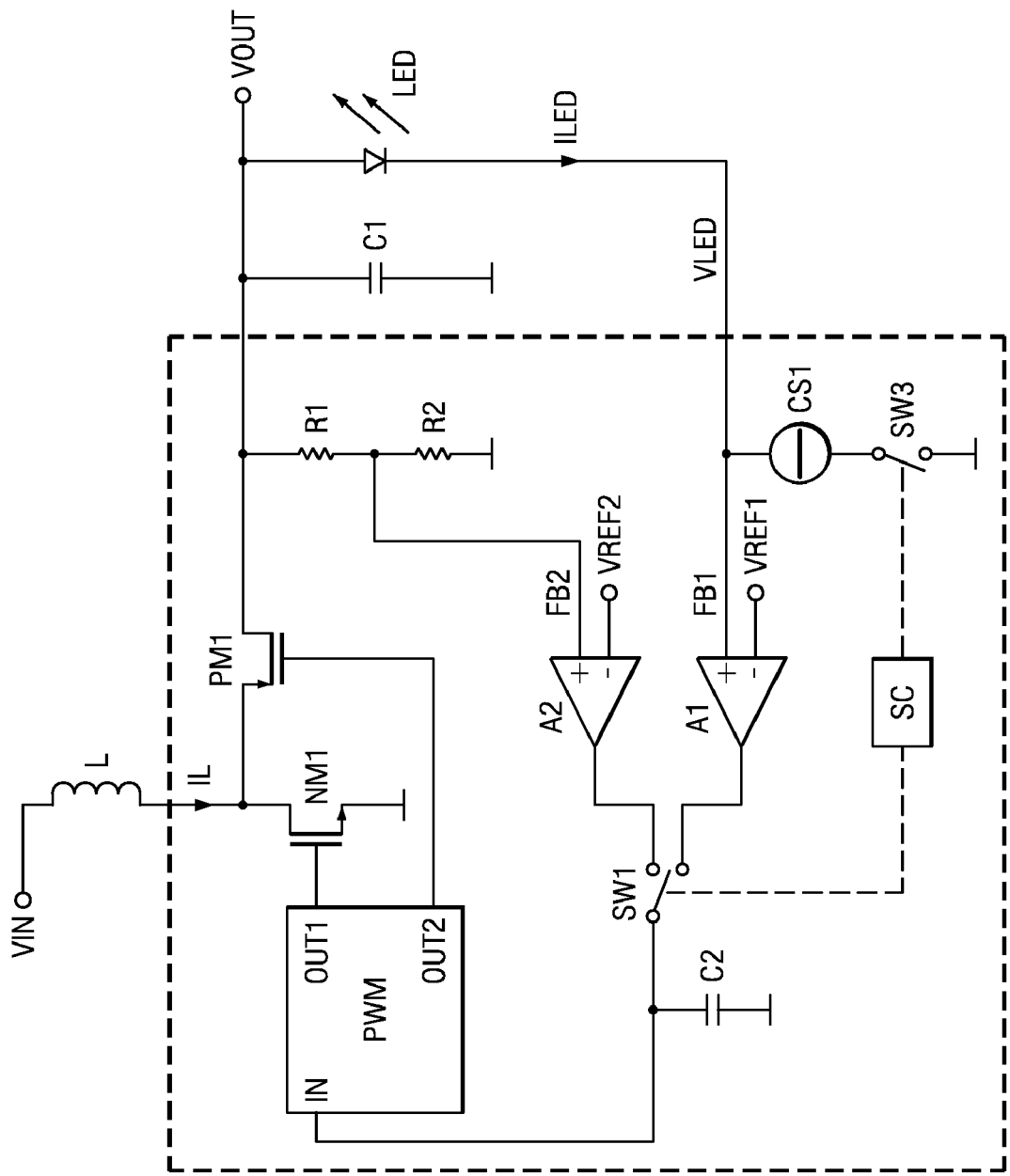
FIG. 1 shows a simplified schematic of a DC-DC converter according to an embodiment of the principles of the invention.

FIG. 1 shows a simplified schematic of an example DC-DC converter according to an aspect of the invention. The DC-DC converter includes a power switch, as, for example, a power NMOS transistor NM1, and a second switch (or a diode) PM1, and a pulse width modulator PWM for controlling the power switch NM1 and the switch PM1. The primary power supply is represented by VIN on one side of the inductor L. The pulse width modulator PWM switches the switches NM1 and PM1 in order to provide a regulated output voltage VOUT at the output node of the DC-DC converter. A capacitor C1 serves to buffer and smooth the output voltage VOUT.

The DC-DC converter provides two modes of operation: a current regulation mode and a voltage regulation mode. In the current regulation mode, a substantially constant output current is fed to a load by a current sink CS1 (for example, an LED) and the voltage VLED is controlled to a specific value. The output voltage VOUT basically follows VLED plus the LED forward voltage, which means typically that VOUT decreases. In the voltage regulation mode, a constant output voltage VOUT is produced at the output terminal. When the output current path through the LED is switched off (by switch SW3, described below), VLED basically follows VOUT.

There are two error amplifiers A1, A2 for comparing feedback voltages FB1, FB2 with a respective reference voltage VREF1, VREF2. A first feedback path is coupled to the first error amplifier A1 and adapted to provide a first feedback voltage FB1 derived from the current source CS1 which provides the output current ILED flowing through the LED. In the embodiment shown in FIG. 1, the first feedback voltage FB1 is equal to the voltage VLED. Error amplifier A1 compares the first feedback voltage FB1 to a first reference voltage VREF1, to provide a first comparison result at the output of the first error amplifier (comparator) A1. A second feedback path is coupled to the second error amplifier A2 and adapted to provide a second feedback voltage FB2 derived from the output voltage VOUT by voltage divider R1, R2. The feedback voltages FB1, FB2 are different from each other. The second error amplifier A2 compares the second feedback voltage FB2 with a second reference voltage VREF2 to provide a second comparison result.

A switch SW1 is adapted to connect a control input of the pulse width modulator PWM alternatively to the output of the first error amplifier A1 or to the output of the second error amplifier A2, in response to a transition from the current regulation mode to the voltage regulation mode, and vice versa. Switch SW3 is used to connect the light emitting diode LED to the current sink CS1, thereby switching on the LED. The current sink CS1 may be implemented as a current mirror, or the like.

In order to establish a predetermined regulated VLED, the DC-DC converter enters into the current control mode. In the current control mode, the voltage FB1 (VLED) at the current sink CS1 is used as an input for the first error amplifier A1. When the output of error amplifier A1 is switched to the control input of the pulse width modulator PWM, the first regulation loop is closed and the output voltage VOUT follows the regulation for VLED. The LED serves only to illustrate a light emitting semiconductor device. Instead of one LED, numerous LEDs in parallel or in series, as well as a single or multiple LEDs on one die, may be used. A switching sequence control stage SC symbolizes additional control mechanisms used to provide the correct switching sequence for switches SW1 and SW3. The two error amplifiers A1 and A2 share the same compensation network (which is reflected here by compensation capacitor C2). Dependent on the mode of regulation, either the first error amplifier A1 or the second error amplifier A2 is connected to the compensation capacitor.

The dashed line in FIG. 1 indicates a possible partitioning between parts, the parts within the dashed line typically integrated onto a single die (chip) comprising silicon or other semiconductor material and those outside the dashed line not integrated, i.e., being left external to the chip and typically located on a board together with the chip. The configuration indicated by the dashed line in FIG. 1 relates to a typical CMOS or BICMOS technology. However, a different partitioning may be applied for different technologies.

FIGS. 2A-2D illustrate waveforms relating to the output voltage VOUT, the voltage VLED at the light emitting diode LED, the current IL through the inductor L, and the current ILED through the light emitting diode LED, respectively (see voltage and current indications in FIG. 1).

FIGS. 2A-2D show a typical mode transition situation, wherein the DC-DC converter is switched from voltage regulation mode to current regulation mode at 200 µs. Correspondingly, the DC-DC converter is switched from regulating VOUT (i.e., from the voltage regulation mode) to regulating VLED (i.e., to the current regulation mode). So, the DC-DC converter allows switching from one regulation mechanism to the other by switching the control input of the pulse width modulator between the outputs of the first and the second error amplifiers. However, if the DC-DC converter switches from voltage regulation mode to current regulation mode, the voltage VLED at the light emitting diode LED starts from a very high voltage, far away from the voltage level to be achieved in a current regulation mode. During the voltage regulation mode, the light emitting semiconductor device LED is disconnected by switch SW3, which means that VLED is almost equal to VOUT (e.g., typically 5 V). The current regulation loop (the first feedback loop) tries to regulate VLED down to a much smaller voltage (e.g., 250 mV).

FIG. 2A shows the input voltage VIN from the primary power supply which is constant throughout, and the output voltage VOUT which drops down after 200 µs and oscillates for the next 40 µs. FIG. 2B shows the voltage VLED at the light emitting diode. The first part of the waveform is not shown, VLED being close to VOUT, as described above. After switching from the voltage regulation mode to the current regulation mode at 200 µs, VLED drops down. As shown in FIG. 2C, the regulation activities of the first feedback loop result in significant uncontrolled negative inductor currents. This may entail a strong voltage overshoot in the primary power supply (e.g., a battery). FIG. 2D shows the current through the light emitting diode LED. After closing switch SW3 (shown in FIG. 1), the current ILED increases in order to reach a final value of approximately 0.5 A. As shown in all FIGS. 2A-2D, the transition from the voltage regulation mode to the current regulation mode entails a long period where the currents and voltages approach in an oscillating manner their final values.

Figure 3:
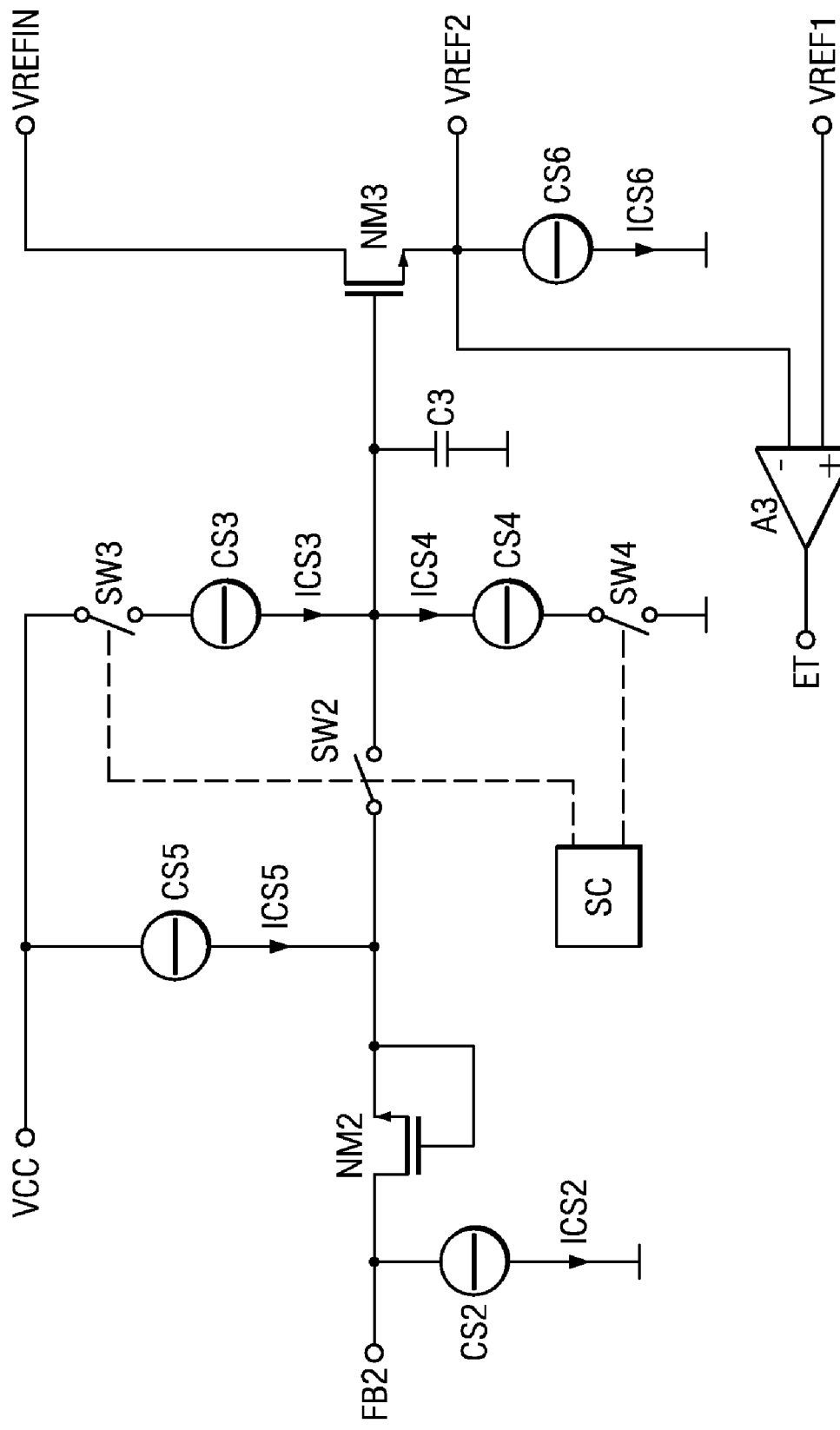
FIG. 3 shows a simplified schematic of an example circuit implementation for varying the second reference voltage in accordance with principles of the invention.

FIG. 3 shows a simplified schematic of a circuit implementation used to control the second reference voltage VREF2 according to the invention. During the current regulation mode, the second feedback voltage FB2 is coupled through an NMOS transistor NM2 and a switch SW2 to the gate of an NMOS transistor NM3. Current sources CS2 and CS5 source and sink approximately the same current (ICS5 is equal to ICS2), which flows through transistor NM2. Transistor NM2 is diode-coupled and the current ICS6 provided by current source CS6 is also equal to ICS5 and ICS2, so that the gate-source voltage of transistor NM3 reaches a value, such that VREF2 equals FB2. If the control mode of the DC-DC converter is switched from the current regulation mode to the voltage regulation mode, the switch SW3 is closed and the current source CS3 adds a specific current ICS3 such that the voltage at capacitor C3 and at the gate of transistor NM3 increases smoothly. Accordingly, the voltage VREF2 approaches VREFIN. If the DC-DC converter is switched from the voltage regulation mode to the current regulation mode, switch SW4 is switched on and SW3 is switched off. Accordingly, the second reference voltage VREF2 is slowly ramped down. The converter remains in the voltage regulation mode until VREF2 is equal to VREF1 (e.g., 250 mV) and then the DC-DC converter is switched to the current regulation mode. The comparison between VREF1 and VREF2 is carried out by error amplifier A3. The end of transition is indicated by signal ET. The switching control of switches SW2, SW3 and SW4 is symbolized by the sequence control stage SC.

Figure 4A:
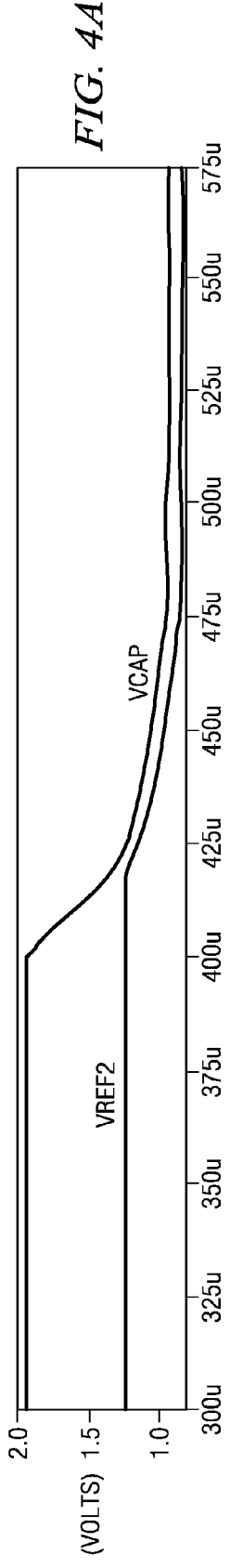
FIGS. 4A-4D show waveforms of voltages and currents of a DC-DC converter with a circuit according to the embodiment of FIG. 3 being switched from voltage regulation mode to current regulation mode.
Figure 4B:
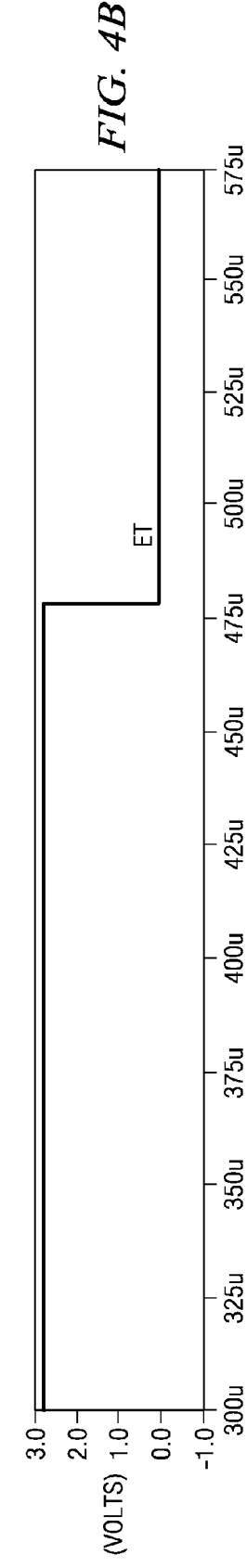
Figure 4C:
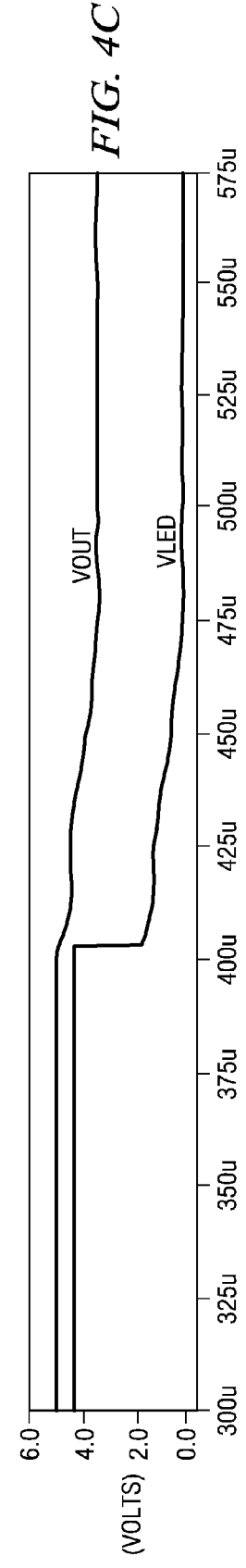
Figure 4D:
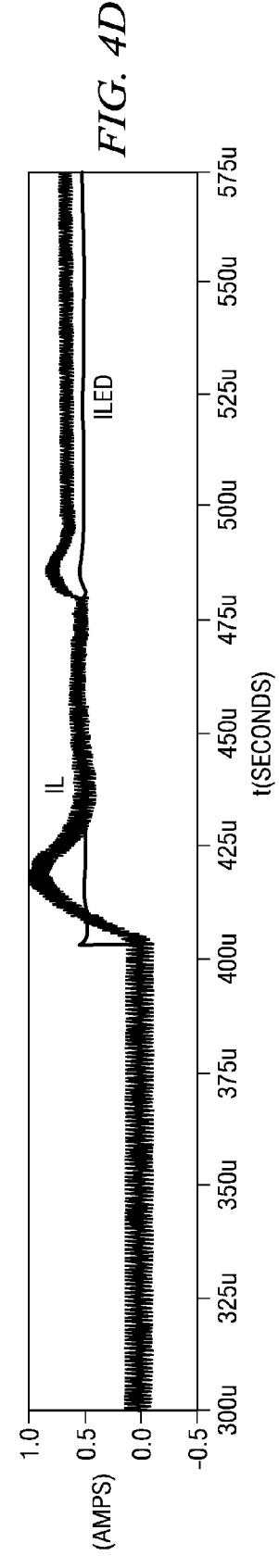

FIGS. 4A-4D show waveforms of some voltages and currents in a DC-DC converter according to the invention having a reference voltage controller as shown FIG. 3. As a result, no negative currents occur at the inductor L, and the inductor current IL is smoothly regulated to the target value. At 400 μs, the DC-DC converter is switched from the voltage regulation mode to the current regulation mode. As shown in FIG. 4A, the reference voltage VREF2 is smoothly decreased from approximately 1.25 V to 0.25 V, which is the value of VREF1 (not shown in FIG. 4A). FIG. 4B shows the end of transition signal ET indicating that the second reference voltage VREF2 is sufficiently close to the first reference voltage VREF1, such that the control input of the pulse width modulator can be switched. FIG. 4C shows the output voltage VOUT and the voltage at the light emitting diode VLED. The output voltage VOUT decreases smoothly after 400 μs. VLED shows a sharp edge due to switching on of the current path through the LED. After this first drop, the voltage VLED approaches smoothly approximately 250 mV. FIG. 4D shows the currents IL and ILED. Both currents reach their final levels smoothly without undue oscillation.

FIGS. 5A-5D show the same signals as shown in FIGS. 4A-4D, but now for a change from current regulation mode to voltage regulation mode at 800 μs. In this situation, the output of the second error amplifier A2 is connected immediately to the control input of the pulse width modulator. As the second reference voltage VREF2 has been kept close to the second feedback voltage FB2 during the current regulation mode, no oscillation occurs. After 800 μs, the second reference voltage VREF2 is smoothly increased to reach approximately 1.25 V after 950 μs. The end of transition signal ET changes immediately at 800 μs indicating that the control input of the pulse width modulator is immediately switched to the output of the second error amplifier A2. As VREF2 is increased smoothly, VOUT follows as shown in FIG. 5C and increases smoothly from 3.5 V at 800 μs to 5 V at 950 μs. The current ILED through the light emitting diode LED, shown in FIG. 5D is turned off to OA, and the current IL through the inductor L enters into a periodic oscillation required to establish a constant output voltage VOUT.

FIGS. 5A-5D generally show the smooth transition when switching from the current regulation mode to the voltage regulation mode. VREF2 in FIG. 5A reflects the controlled reference voltage. Before 800 μs, the current regulation mode is carried out. When the DC-DC converter is switched to the voltage regulation mode at 800 μs, the internal reference voltage VREF2 starts to ramp up slowly, which allows to boost regulation loop to follow and therefore ramp up VOUT to 5 V without a significant impact on the inductor current IL.

Those skilled in the art to which the invention relates will appreciate that the described embodiments are merely illustrative examples, and that there are many other possible embodiments and variations thereof, within the scope of the claimed invention.

What is claimed is:

1. A DC-DC converter comprising
a power stage driven by a pulse width modulator;
a first error amplifier with a first input coupled to a first reference voltage source and a second input coupled to a current sink through which a current is fed from an output of the power stage to receive a first feedback voltage;
a second error amplifier with a first input coupled to a second reference voltage source and a second input coupled to the output of the power stage to receive a second feedback voltage; and
a switch for connecting a control input of the pulse width modulator with the output of the first error amplifier in a current regulation mode and with the output of the second error amplifier in a voltage regulation control mode;
a reference voltage controller for dynamically changing the value of the second reference voltage source to reduce transients, upon switching between the voltage and current regulation modes, wherein the reference voltage controller is configured and adapted to change the value of the second reference voltage source from a predetermined value towards the first reference voltage after a transition from the voltage regulation mode to the current regulation mode; to supply a first comparison result to the input of the pulse width modulator by the switch only when the second reference voltage is substantially equal to the first reference voltage; to keep the second reference voltage close to the second feedback voltage in the current regulation mode; and to change the second reference voltage back to the predetermined reference voltage value only after connecting the output of the second error amplifier to the control input of the pulse width modulator by the switch in response to a transition from the first voltage regulation mode to the current regulation mode.

* * * * *